Patented Jan. 4, 1944

2,338,469

UNITED STATES PATENT OFFICE 2,338,469

POLYAMIDE

Kurt Thinius, Eilenburg, Germany; vested in the Alien Property Custodian

No Drawing. Application March 13, 1941, Serial No. 383,225. In Germany March 3, 1940

1 Claim. (Cl. 260—33)

My present invention relates to polyamides and more particularly to polyamides containing plasticizers.

Fibers, filaments, films, plastic articles, artificial leather and the like may also be produced in different ways from polyamides, i. e. synthetic polymerized condensation products having the recurring atom grouping —NH—CO—. In order to render these molded articles suitable for various purposes it is convenient to use softening agents in the production thereof. The addition of the usually employed esters of polybasic inorganic or organic acids with aliphatic or aromatic alcohols or phenols in the working up of polyamides has, however, proved without success. Provided that the polyamides and these known substances are compatible with each other, the small amount thereof which can be added, only unessentially influences the properties of the polyamide, for instance, of polyamide foils, in the desired direction. This object could surely be accomplished by the employment of polyhydric alcohols as plasticizers. However, these compounds have the disadvantage not to be water-insoluble. It is noted that both classes belong to the group of non-gelatinizing plasticizers. The working up of the polyamides, however, necessitates the presence of a gelatinizing softening agent in many cases.

The present invention is based on the observation that 3-chloropropyleneglycol-(2)-phenylether-(1) is a plasticizer for polyamide which is not only compatible with polyamides in any proportion but also insoluble in water. Moreover this chloroether is capable of dissolving to a certain extent interpolyamides as, for instance, prepared from adipic acid, hexamethylenediamine, and caprolactam already at ordinary temperature. On heating the polymers from these reactants completely dissolve in this softening agent. The chloroether of the invention is a viscous liquid clear as water and soluble in the usual organic solvents. It meets the requirements as for volatility, fastness to light and resistance to cold and heat. It is furthermore of advantage that the chloroether can be worked up together with every pigment since it is free from acid. Finally the new plasticizer possesses the property to increase the compatibility of the polyamides with the substances hitherto used as softening agents.

The following examples illustrate the invention:

Example I 20 g. of 3-chloropropyleneglycol-(2)-phenylether-(1) are added to a solution consisting of 80 g. of an interpolyamide from hexamethylenediamine adipate and caprolactam, 216 g. of a mixture of methanol (80%) and methylenechloride (1:1), 40 g. of ethylenechlorohydrine and 8 g. of butanol. On casting the solution forms a pliable polyamide film which is preferably suited to wrapping material and the like. The solution may also be used as a lacquer or adhesive.

Example II 80 g. of 3-chloropropyleneglycol-(2)-phenylether-(1) is mixed with the interpolyamide solution described in Example I. The solution thus obtained is then cast to form a film. This film is capable of adhering to glass plates especially strongly and is, therefore, preferably suitable for the production of compound glass. With an addition of pigments such films may also be used as leather substitutes.

Example III

A pasty mass is prepared by mixing about equal amounts of a finely powdered polyamide and 3-chloropropyleneglycol-(2)-phenylether-(1). The paste is applied to an absorptive support of any structure and composition. The paste is gelatinized at elevated temperature and one thus obtains a waterproof coating on the support having a soft and flexible touch. By additions of filling agents, pigments and/or other substances products like artificial leather the surface of which may be modified by a pressure treatment together with or subsequent to a gelatinizing procedure can be obtained in this convenient manner. If desired, the pasty mixture may also be produced and used with an addition of organic liquids capable of dissolving or swelling the polyamide and/or the plasticizer. Finally especially thinly liquid compositions can be prepared by mixing the polyamide with an aqueous emulsion of the plasticizer.

I claim:

A synthetic polymerized condensation product containing 3-chloropropyleneglycol-(2)-phenylether-(1) as plasticizer, said condensation product being the reaction product of hexamethylene diamine, adipic acid and caprolactam.

KURT THINIUS.